Nov. 27, 1934.  A. J. FISCHER  1,982,246
DIGESTION OF SEWAGE SLUDGE
Filed Oct. 11, 1930
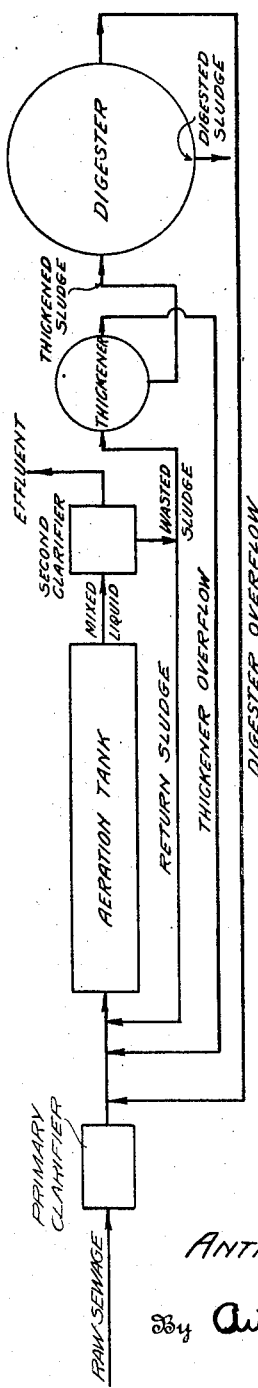
Inventor
ANTHONY J. FISCHER,
By Arthur Middleton
Attorney Patented Nov. 27, 1934

1,982,246

UNITED STATES PATENT OFFICE 1,982,246

DIGESTION OF SEWAGE SLUDGE

Anthony J. Fischer, New York, N. Y., assignor, by mesne assignments, to The Dorr Company, Inc., New York, N. Y., a corporation of Delaware Application October 11, 1930, Serial No. 487,989

4 Claims. (Cl. 210—8)

This invention relates to the digestion of sewage sludge and its object is to concentrate the sewage sludge before it is digested. I attain this object by causing the production of, as an intermediate step in the usual process, an acid condition in the thin sludge by exposing it to the action of septic bacteria between the clarifier and the digester.

Solids which settle very slowly in the clarifier, settle to about one-third of their volume when in the presence of an acid condition. So, after separation by decantation, the solids which go to the digester have eliminated largely therefrom, the large volume of liquid which has heretofore resulted in the objectionable overflow from the digester.

In ordinary plant practice, activated sludge is pumped directly from the final clarifier to the digester. In a well operated plant, the solid content of this sludge rarely exceeds 1.5% by weight. This high moisture content is detrimental in that it increases the volume of digester overflow and causes greater heat loss in a heated digester. The thin sludge also requires a larger sized digester.

If, however, the sludge is pumped to a thickening tank of the Dorr type wherein mechanical means are provided for facilitating the compression of the sludge, for instance, as shown in Patent No. 1,938,934, patented December 12, 1933, and allowed to remain there for a period of approximately 24 hours, a much denser sludge is obtained. This sludge can then be digested. The thickening action appears to be due in great part to septic action which takes place when the sludge is allowed to stand for long periods. It is also aided by the greater zone of compression because of the greater permissible depth of sludge in the separate tank.

A feature of this invention is to detain the sludge from a clarifier before its digestion, in a decanting thickener while acid bacterial conditions exist in the thickener. The thickener has travelling raking members which are effective to squeeze out or release acid liquid from the sludge, causing it to escape upwardly and out through the thickener overflow.

In order that my use of this thickening tank may be clearly understood, I have illustrated its hook-up by an accompanying flow-sheet which makes it plain that my acid conditioning tank or thickener is placed between the usual secondary or final clarifier and the digester. Sludge from the thickener goes to the digester and overflow from the decanting thickener is returned to the usual aeration tank.

In the flowsheet illustrated in the drawing, the raw sewage flows to the aeration tank where it is mixed with air and the mixed liquid flows to a secondary clarifier. The underflow from the clarifier is led to the thickener which embodies my invention. In this thickener the sewage sludge is settled and concentrated. It is in this thickener that its bulk or volume is materially decreased. This compressed sludge is drawn out as underflow from the thickener and fed to the usual sewage digester. As is usual in sewage layouts, some effluent or overflow from the thickener may be returned to the feed to the aeration tank and some effluent from the digester may also be returned to the aeration tank. Also as is somewhat customary, the sludge from the secondary clarifier may also be returned to the aeration tank.

Actual experiments have shown that a sludge containing only 0.8% solids can be settled to 25% of its original volume when allowed to stand for 22 hours in a tube 6 ft. high. The same sludge would not thicken at all in two hours under practical operating conditions which is the normal time of retention of the sewage in secondary clarifier before adding to the digester.

The advantage of this system is that the usual size of the digester can be greatly reduced; the heat losses lessened; and the volume of overflow materially cut down.

Whereas I have described my acid conditioning tank for use with activated sludge, I may use it in connection with thickening raw sludge or with digester overflow.

I claim:

1. A sewage sludge treating apparatus comprising an aeration tank, a secondary clarifier into which sludge from the aeration tank is adapted to pass, an acid-conditioning decanting thickener for receiving sludge from the clarifier, and a digester for receiving sludge from the thickener.

2. The process of sewage treatment comprising exposing the sewage to primary clarification to separate sludge therefrom, exposing the effluent from said primary clarification to aeration, exposing the aerated sewage to secondary clarification to separate sludge therefrom, and then exposing the separated sludge to digestion; characterized by thickening the sludge or sludges from the clarification steps and decanting liquid therefrom prior to digestion.

3. The process of sewage treatment comprising clarifying aerated sewage to separate solids therefrom in the form of sludge, thickening said separated sludge for a time while decanting liquid therefrom, and then digesting said thickened sludge.

4. In the process of sewage treatment comprising clarifying sewage to separate solids therefrom in the form of sludge, and subsequently digesting the sludge, the step of detaining the sludge from the clarifier, before its digestion, in a decanting thickener wherein acid bacterial conditions exist. ANTHONY J. FISCHER.